US009230035B2

(12) United States Patent
Bao et al.

(10) Patent No.: US 9,230,035 B2
(45) Date of Patent: Jan. 5, 2016

(54) PUSHING SPECIFIC CONTENT TO A PREDETERMINED WEBPAGE

(71) Applicant: International Business Machines Corporation, Armonk, NY (US)

(72) Inventors: Sheng Hua Bao, Beijing (CN); Hong Lei Guo, Beijing (CN); Zhili Guo, Beijing (CN); Zhong Su, Beijing (CN); Hui Jia Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 14/012,085

(22) Filed: Aug. 28, 2013

(65) Prior Publication Data
US 2014/0067818 A1    Mar. 6, 2014

(30) Foreign Application Priority Data

Aug. 31, 2012    (CN) .......................... 2012 1 0318654

(51) Int. Cl.
*G06F 7/00*    (2006.01)
*G06F 17/30*    (2006.01)

(52) U.S. Cl.
CPC ...... *G06F 17/3089* (2013.01); *G06F 17/30867* (2013.01); *G06F 17/30899* (2013.01)

(58) Field of Classification Search
None
See application file for complete search history.

(56) References Cited

U.S. PATENT DOCUMENTS

| | | | |
|---|---|---|---|
| 7,073,129 B1 * | 7/2006 | Robarts et al. ................. | 715/740 |
| 2003/0072289 A1 * | 4/2003 | Yuang et al. ................... | 370/338 |
| 2005/0246338 A1 * | 11/2005 | Bird ................................... | 707/9 |
| 2006/0235985 A1 * | 10/2006 | Ramkumar et al. .......... | 709/229 |
| 2008/0104695 A1 * | 5/2008 | Fassino et al. .................. | 726/17 |
| 2009/0222303 A1 | 9/2009 | Higgins et al. | |
| 2010/0185564 A1 | 7/2010 | King et al. | |
| 2012/0036085 A1 | 2/2012 | Srivastava et al. | |
| 2012/0185544 A1 | 7/2012 | Chang et al. | |
| 2013/0066716 A1 * | 3/2013 | Chen et al. ................. | 705/14.49 |

FOREIGN PATENT DOCUMENTS

| WO | WO-2010/001406 A1 | 1/2010 |
|---|---|---|
| WO | WO-2011/029125 A1 | 3/2011 |

OTHER PUBLICATIONS

Fan et al., "Sentiment-oriented contextual advertising", Knowl Inf Syst, vol. 23, pp. 321-344, Springer-Verlag London Limited, 2009.*

(Continued)

*Primary Examiner* — Michael Hicks
(74) *Attorney, Agent, or Firm* — Scully, Scott, Murphy & Presser, P.C.; Jeff Tang, Esq.

(57) ABSTRACT

A method and an apparatus for pushing specific content for a predetermined webpage, and a website server. The method for pushing specific content for text content on a predetermined webpage comprises: subjecting text content on a predetermined webpage to emotional analysis; determining a matching degree between a result of the emotional analysis and an emotion expressed by specific content to be pushed; and responding to that the matching degree determined above satisfies a predetermined condition, combining a part of the text content with the specific content to be pushed, thereby forming content to be pushed specific for users. By using the technology of the present invention, user can be avoided from feeling disgust for content to be pushed and accuracy of push can be enhanced.

18 Claims, 8 Drawing Sheets

(56) References Cited

OTHER PUBLICATIONS

Vinodhini et la., "Sentiment Analysis and Opinion Mining: A Survey", International Journal of Advanced Research in Computer Science and Software Engineering, vol. 2, Issue 6, Jun. 2012.*

Gamon et al., "Sentiment classification on customer feedback data: noisy data, large feature vectors, and the role of linguistic analysis", COLING '04, Article No. 841, ACM, 2004.*

Feng et al., "Extracting common emotions from blogs based on fine-grained sentiment clustering", Knowledge and Information Systems, vol. 27, Issue 2, pp. 281-302, Springer-Verlag London Limited, 2010.*

Thelwall et al., "Sentiment Strength Detection in Short Informal Text", Journal of the American Society for Information Science and Technology, 61(12), pp. 2544-2558, 2010, Wiley Online Library.*

Baldoni et al., "From Tags to Emotions: Ontology-driven Sentiment Analysis in the Social Semantic Web", Intelligenza Artificiale, 6(1), pp. 41-54, IOS Press.*

Park et al., "The Politics of Comments: Predicting Political Orientation of News Stories with Commenters' Sentiment Patterns", CSCW 2011, pp. 113-122, 2011, ACM.*

Ellie Brown, How implementing social media strategies (the right way) attracts customer loyalty, 2010.

Strategic brand management, Emotions and Brands, pp. 21-46.

Jeanne Soresen, Measuring emotions in a consumer decision-making context-approaching or avoiding, Aalborg University, Department of Business Studies, 2008.

Shenghua Bao and Shengliang Xu, et al, Mining Social Emotions from Affective Text, IEEE Transactions on Knowledge and Data Engineering, 2012.

Albert Mehrabian, Basic dimensions for a general psychological theory, pp. 39-53, ISBN 0-89946-004-6, 1980.

Robert Freed Bales, Social interaction systems: theory and measurement, pp. 139-140. ISBN 0-7658-0872-2, 2001.

Ye Liu, Xiaolan Fu, Linmi Tao, PAD based emotion measurement, pp. 9-13, CCF Communication v6, Issue 5.

Wikipedia, PAD Emotional State Model, http://en.wikipedia.org/wiki/PAD_emotional_state_model.

* cited by examiner

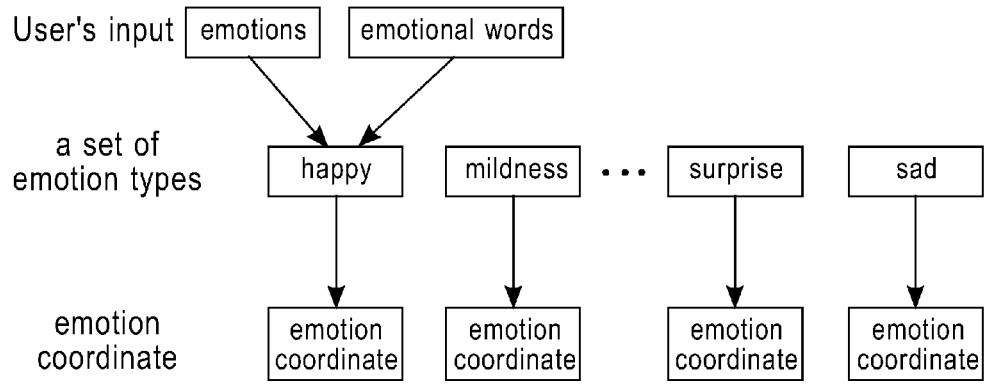

FIG. 4B

A: I received a mysterious gift today ☺
7 min ago from Weibo    retweet/Favorites/Comments ☐ retweet to my Weibo at same time    Add comments here B: "Really happy for you, what gift? Show it 😃 (40 sec ago)

C: "Cong!" (six minutes ago)

D: "Wow, how happy!" (six minutes ago)

I recveived a mysterious gift today. Share your joy with friends and you will have it doubled.

Really happy for you! Share your joy with friends and you will have it doubled.

How happy! Share your joy with friends and you will have it doubled.

FIG. 5

A: work does not go smooth recently, annoying 4 min ago from Weibo            retweet/Favorites/Comments ☺ ☐ retweet to my Weibo at same time     Add comments here B: Fighting! (20 seconds before)   delete/reply C: Me too, poor (40 seconds before)   delete/reply D: Be strong! You can do it (50 seconds before)   delete/reply

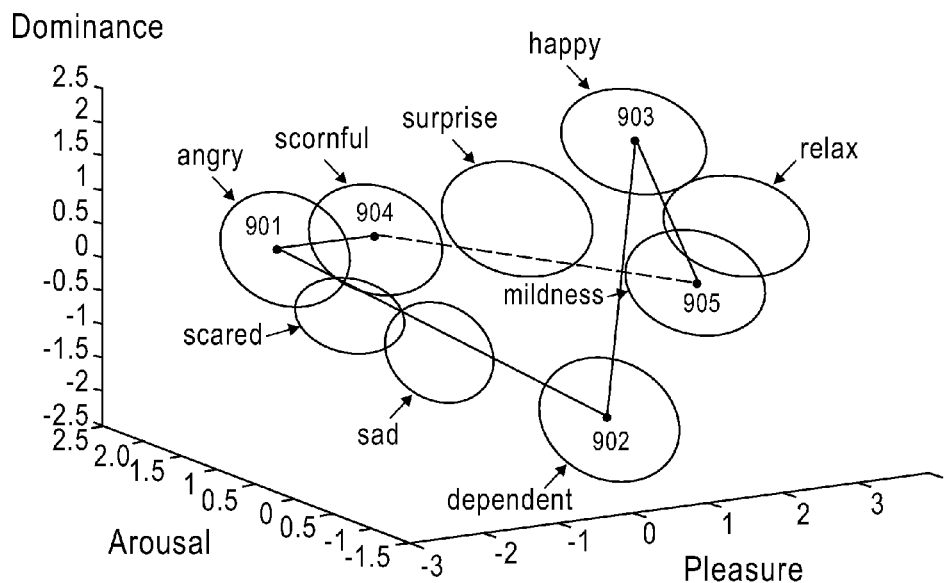

FIG. 9

A: I received a mysterious gift today ☺

7 min ago from Weibo    retweet/Favorites/Comments

☺ ☐ retweet to my Weibo at same time    Add comments here

B: Fighting! (20 seconds before) delete/reply

C: Me too, poor (40 seconds before) delete/reply

D: Be strong! You can do it (50 seconds before) delete /reply

Be strong. As Heaven's movement is ever vigorous, so must a gentleman ceaselessly strive along.

FIG. 10

PUSHING SPECIFIC CONTENT TO A PREDETERMINED WEBPAGE

CROSS-REFERENCE

This application claims priority under 35 U.S.C. §119 from Chinese Patent Application No. 201210318654.X filed on Aug. 31, 2012 the entire contents of which are incorporated herein by reference.

BACKGROUND

1. Field of Invention

The present invention relates to a method and an apparatus for pushing specific content to a predetermined webpage as well as a website server, and more specifically, to pushing specific content to a webpage by emotional analysis of content on this webpage.

2. Description of the Prior Art

Nowadays, almost every website provides a function for user interaction. For example, various portals such as Sina.com, Sohu.com, and People.com.cn have provided user input interfaces for people to comment on messages, news or the like appearing on these portals. Another example is numerous social networks, such as Facebook, Kaixin, personal blog, and Weibo. People can share information with others and receive responses from others through such social networks as well, and thus interact with each other through a network.

Massive user input content is a valuable resource. In the prior art, pushing predetermined content based on user input already exists. However, the prior art adopts a basic form of pushing content. For example, existing push technology, generally, simply determines whether or not a specific word is used in the user input. If a specific word in user input is used, this technology simply pushes information that is prepared for this specific word in advance, no matter what the content of the user input is and what emotion it expresses. In other words, in the prior art, push technology adopts a way to focus on push content. However, this ignores, to a great extent, the content of the user input and the matching result between the push content and the content of the user input. As a result, it is likely that the pushed content is not what the user expects to receive and may even make the user feel dissatisfaction for such push content. Thus, using the existing push technology possibly results in decreased user satisfaction.

SUMMARY

In light of the above and other problems, the present disclosure provides a user-oriented push technology which determines how to push predetermined content by focusing on content of user input, thereby improving push efficiency and user relevance.

One embodiment of the present invention provides a method for pushing specific content for text content on a predetermined webpage, including: subjecting the text content on a predetermined webpage to emotional analysis; determining a matching degree between a result of the emotional analysis and an emotion expressed by the specific content to be pushed; and responding to the determined matching degree that satisfies a predetermined condition, combining at least a part of the text content with the specific content to be pushed, thereby forming the final pushing content for specific users.

Another embodiment of the present invention provides a method for pushing specific content for text content on a predetermined webpage, including: subjecting both text content on a predetermined webpage and a reply text to the content to emotional analysis; determining a matching degree between a result of the emotional analysis of the replied text and a result of the emotional analysis of text content and a matching degree between the result of emotional analysis of the replied text and an emotion expressed by the specific content to be pushed, thereby obtaining a first matching degree and a second matching degree; and in response to that the first matching degree and the second matching degree determined satisfying a predetermined condition, combining a part of the replied text with the specific content to be pushed to form pushing content specific for users A further embodiment of the present invention provides an apparatus for pushing specific content for text content on a predetermined webpage, including: an emotional analysis unit configured to subject text content on a predetermined webpage to emotional analysis; a matching degree determination unit configured to determine a matching degree between a result of the emotional analysis and an emotion expressed by specific content to be pushed; and a pushing unit configured to combine a part of the text content with the specific content to be pushed, in response to the matching degree determined above that satisfies a predetermined condition, thereby forming push content specific for users.

A further embodiment of the present invention provides an apparatus for pushing specific content for text content on a predetermined webpage, including: an emotional analysis unit configured to subject both text content on a predetermined webpage and reply text to emotional analysis; a matching degree determination unit configured to determine a matching degree between a result of emotional analysis of the reply text and an emotion expressed by specific content and a matching degree between a result of emotional analysis of the text content and an emotion expressed by specific content to be pushed, thereby obtaining a first matching degree and a second matching degree; and a pushing unit configured to combine a part of the replied text with the specific content to be pushed, in response to the first matching degree and the second matching degree determined above that satisfies a predetermined condition for text content on a predetermined webpage, thereby forming push content specific for users.

One embodiment of the present invention can determine how to push predetermined content by focusing on the content of user input, and thus can enhance client acceptance of the pushed content and improve push efficiency.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4B shows a schematic process of acquiring emotions from content of user input until emotion matching degree is determined;

FIG. 5 shows an effect obtained by using a push technology of the present invention;

FIG. 9 shows a schematic view for calculating emotion matching degree according to one embodiment of the present invention;

FIG. 10 shows an effect obtained after the push technology of this embodiment is applied.

DETAILED DESCRIPTION

Figure 1:
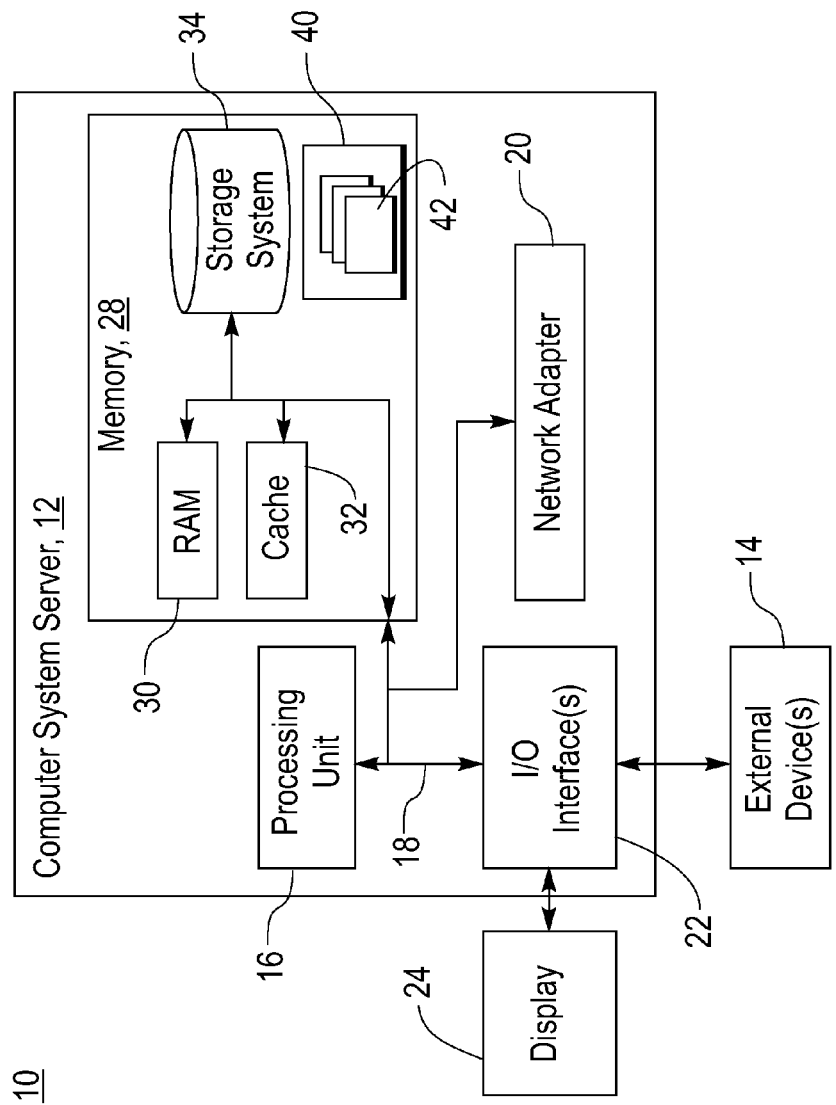
FIG. 1 shows an exemplary computer system 100 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in block(s) of the flowcharts and/or block diagrams.

FIG. 1 shows an exemplary computer system/server 12 which is applicable to implement the embodiments of the present invention. The computer system/server 12 shown in FIG. 1 is merely an example, which is not intended to impose any limitations on functions and application ranges of the embodiments of the present invention.

As shown in FIG. 1, the computer system/server 12 is embodied in the form of a general-purpose computing device. The components of the computer system/server 12 can include, but are not limited to, one or more processors or processing units 16, system storage 28, and a bus 18 for connecting different system components (including system storage 28 and processing unit 16).

The bus 18 represents one or more of several types of bus structures, including storage bus or storage controller, peripheral bus, accelerated graphics port, processor or local bus using any arbitrary one of several types of bus structures. By way of example, these architectures include, but are not limited to, industry standard architecture (ISA) bus, micro channel architecture (MAC) bus, enhanced ISA bus, video electronics standards association (VESA) local bus and peripheral component interconnect (PCI) bus.

The computer system/server 12 typically includes various computer-readable media. These media can be any available media accessible to the computer system/server 12, including volatile and non-volatile media, movable and non-movable media.

The system storage 28 can include a computer-readable medium in the form of a volatile storage, such as, random access memory (RAM) 30 and/or cache memory 32. The computer system/server 12 can further comprise other movable/non-movable, volatile/non-volatile computer system storage media. By way of example, the storage system 34 can be used for reading and writing a non-movable and non-volatile magnetic medium (not shown in FIG. 1, which is generally referred to as "hard disk drive"). Although not shown in FIG. 1, a hard disk drive for reading and writing a movable and non-volatile magnetic disk (for example, "floppy disk") and an optical disk drive for reading and writing a movable and non-volatile optical disk (for example, CD-ROM, DVD-ROM or other optical media) can be provided. In such case, each driver can be interconnected with the bus 18 via one or more data medium interfaces. The system storage 28 can comprise at least one program product having a group of (e.g. at least one) program modules that are configured for implementing functions of the various embodiments of the present invention.

A program/utility 40 having a group of (e.g. at least one) program modules 42 can be stored in the storage 28, and such program modules 42 include, but not limited to, operating system, one or more applications, other program modules and program data, wherein, each one of or a combination of these examples may include the implementation of a network environment. The program modules 42 generally perform the functions and/or methods described in the embodiments of the present invention.

The computer system/server 12 also can communicate with one or more external devices 14 (such as, keyboard, pointing device, and display 24), one or more devices enabling users to interact with the computer system/server 12, and/or any device (such as, network card, modem) enabling the computer system/server 12 to communicate with one or more other computing devices. Such communication can be realized via an input/output (I/O) interface 22. Moreover, the computer system/server 12 also can communicate with one or more networks (for example, local area network (LAN), wide area network (WAN) and/or public network (e.g. Internet) through a network adaptor 20. As shown in the figure, the network adaptor 20 communicates with other modules of the computer system/server 12 via the bus 18. It should be understood that, although not shown in the figure, other hardware and/or software modules can be used in conjunction with the computer system/server 12, including but not limited to, microcode, device driver, redundant processing unit, external disk drive array, RAID system, magnetic tape drive, and data storage and backup system.

Figure 2:
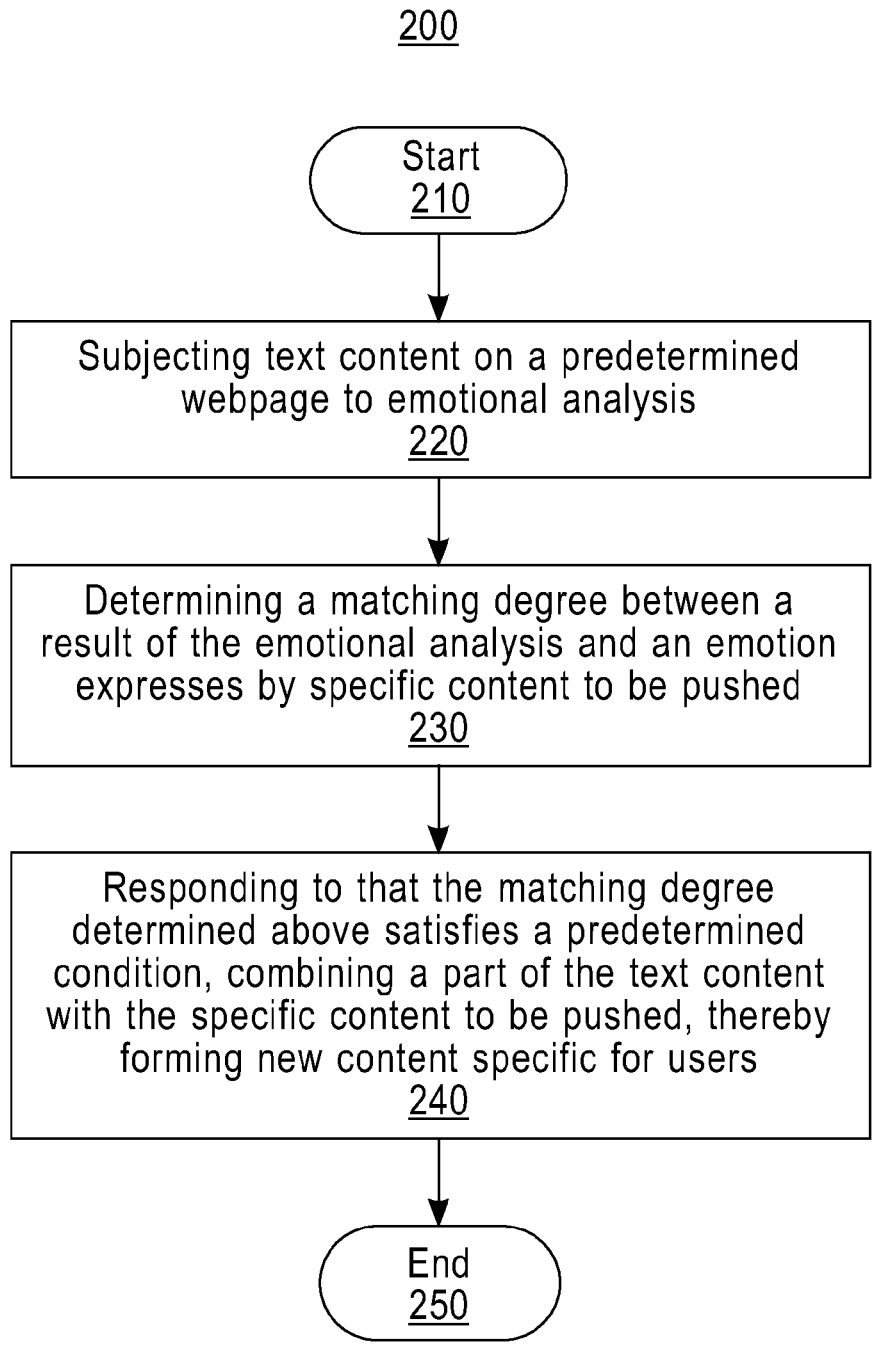
FIG. 2 exemplarily shows a flowchart of a method 200 according to one embodiment of the present invention.

FIG. 2 shows a flowchart of a method 200 according to one embodiment of the present invention. The method 200 starts at step 210. Subsequently, at step 220, text content on a predetermined webpage is subjected to emotional analysis. At step 230, a matching degree between a result of the emotional analysis and an emotion expressed by specific content to be pushed is determined. At step 240, responding to the matching degree that satisfies a predetermined condition, a part of the text content is combined with the specific content to be pushed, thereby forming user-specific pushed content, and this pushed content is displayed on the predetermined webpage. Below, the respective steps of the method 200 will be described in detail in conjunction with the figures.

As a non-limiting example, it is assumed that the content to be pushed is "share your joy with friends and you will have it doubled" according to one embodiment. One of ordinary skill in the art can know that other push content can be freely selected.

Figure 3:
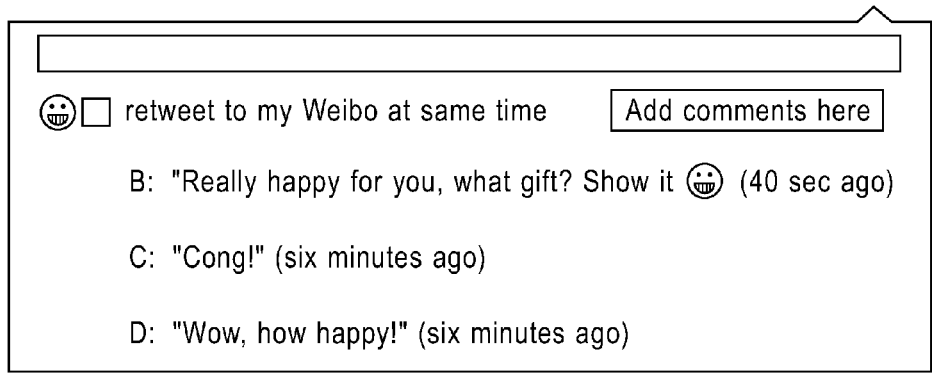
FIG. 3 schematically shows a screenshot of a webpage of typical user input text content.

FIG. 3 schematically shows a screenshot of a webpage of typical user input text content. As shown in the figure, text content and symbols inputted by four users through Weibo are schematically shown in the webpage. On one schematic webpage, four users give input text, wherein user A wrote "I received a mysterious gift today ☺". Subsequently, users B, C, and D, respectively, provide the following replies, i.e. "Really happy for you ☺, what gift? Show it", "Congratulations!", "Wow, how happy!".

However, one of ordinary skill in the art absolutely can understand that, the present invention can be applied to other types of websites containing user input content, and more or less user input content can be contained on the webpage. According to one embodiment of the present invention, text content on a predetermined webpage is subjected to emotional analysis.

As shown in FIG. 2, currently, most websites provide a predetermined symbol set containing various emotional symbols for users to express their emotions. Thus, in one embodiment, these symbols can be extracted directly from a webpage as expressions of user input text. As shown in the figure, the input content from users A and B contains emotional symbols ☺ and ☺ respectively. On the other hand, emotional words can be extracted from text content on a webpage. Content of user input can be extracted from a webpage, and then emotional words can be extracted from the content of user input. As for a technology of extracting emotional words described above, reference can be made to "Mining Social Emotions from Affective Text", Shenghua Bao, Shengliang Xu, et al, IEEE Transactions on Knowledge and Data Engineering (IEEE TKDE), 2012, which is incorporated herein by reference in its entirety.

According to the technology of extracting emotional words described above, for example, an emotional word "gift" is extracted from the input of user A, an emotional word "happy" is extracted from the input of user B, an emotional word "Congratulation" is extracted from the input of user C, and an emotional word "happy" is extracted from the input of user D.

Next, the symbols and/or emotional words extracted above are classified into a particular emotion type in a predetermined set of emotion types. According to one embodiment of the present invention, the predetermined set of emotion types may include eight emotion types, i.e., happy, relaxed, surprise, mildness, dependent, sad, scared, scornful, and angry. One of ordinary skill in the art can understand that the emotion types set forth herein are merely examples given for description, and the emotion types can be determined in advance with more or fewer emotion types in a set. According to one embodiment of the present invention, most of popular emoticons provided by most websites can be directly classified into predetermined emotion types.

For example, as shown in FIG. 3, it can be predefined that emoticons ☺ and ☺ inputted by users A and B are classified into the emotion type of "happy". In one embodiment of the present invention, a correspondence relation between frequently-used emoticons and emotion types can be predefined. For example, the corresponding relationships between frequently-used emoticons and emotion types can be stored in a specific database. After extracting emoticons from a webpage, an emotion type to which a certain emoticon corresponds can be looked up in the database. Thus, an emotion type of an emoticon appearing on a webpage can be known.

On the other hand, the extracted emotional words can be classified into a predetermined emotion type. Similarly, classification of emotional words to emotion types can be implemented by looking up a database in which predefined correspondence relations are stored. In one embodiment of the present invention, this database can contain words selected in advance and a corresponding emotion type is set for each word. Taking FIG. 3 as an example, according to the above document relating to emotion extraction, for example, an emotional word extracted from user A is "gift". In the database, an emotion type to which the emotional word "gift" corresponds can be predefined as "happy". An emotional word extracted from content inputted by user B may be "happy", and this emotional word can be classified into the emotion type of "happy". Similarly, as for "Congratulation" inputted by user C, it can be classified into the emotion type of "mildness", and for user D, the emotional word "happy" can be classified into the emotion type of "happy". However, the above correspondence relation is merely illustrative for the purpose of explaining the embodiments of the present invention, and one of ordinary skill in the art can understand that, it is also possible to make emotional words reasonably correspond to other emotion types. For example, in another database, the word "gift" may correspond to the emotion type of "mildness", or "surprise". Different databases can be selectively used according to content to be pushed, for example, when the content to be pushed mostly involves a mild emotion, a database in which the word "gift" corresponds to the emotion type of "mildness", can be used.

Note that, for users A and B, their inputs contain both emoticons and text, at this point, the emotional classification can be performed on emoticons and text respectively, which are also respectively calculated in the subsequent step of determining a matching degree. However, one of ordinary skill in the art can understand that, emotional words and emoticons can be combined so as to obtain an emotion type for user input.

Back to FIG. 2, after emotional analysis of text content of user input is finished, at step 230, a matching degree between a result of the emotional analysis and an emotion expressed by specific content to be pushed is determined. Below, with reference to FIGS. 4A and 4B, the above step of determining a matching degree will be described in detail. As described above, in one embodiment, exemplary content to be pushed is "share your joy with friends and you will have it doubled". For this content, an emotion type can be predefined. For example, an emotion type of this pushed content can be predefined as "happy". At this point, the emotion type of the content is regarded as a reference emotion type while the emotion type of user input is regarded as a target emotion type, and a matching degree between these two emotion types is calculated.

Figure 4A:
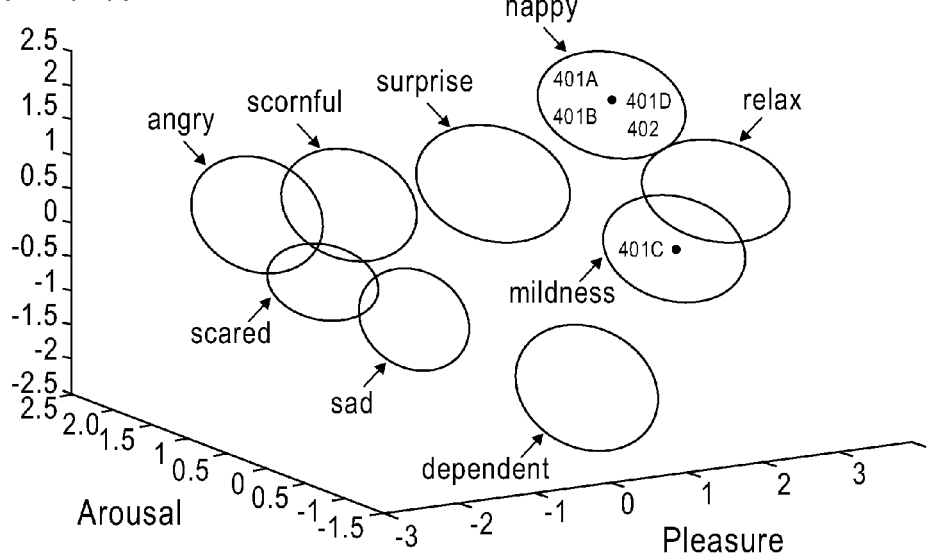
FIG. 4A shows an emotion coordinate system 400 and emotion coordinates obtained by mapping emotion types to the emotion coordinate system 400.

FIG. 4A shows an emotion coordinate system 400 that comprises three coordinate axes respectively representing arousal, pleasure, and dominance, wherein each type of emotion (such as, happy and surprise) occupies a certain space in the emotion coordinate system. According to this coordinate system, each motion can be broken down into three components, i.e. arousal component, pleasure component, and dominance component. When the three coordinate axes of the emotion coordinate system 400 are labeled respectively as x-axis (arousal), y-axis (pleasure), and z-axis (dominance), each emotion can be mapped into the emotion coordinate system 400 and thus has the form of a coordinate such as (x, y, z). As a result, target emotion coordinates 401A ($x_A, y_A, z_A$), 401B ($x_B, y_B, z_B$), 401C ($x_C, y_C, z_C$), and 401D ($x_D, y_D, z_D$) of the target emotion types of users A to D in the emotion coordinate system 400 can be acquired, together with a reference emotion coordinate 402 of the reference emotion type in the emotion coordinate system 400.

As described above, inputs from users A, B, and D are determined as belonging to the emotion type of "happy" while input from user C is determined as belonging to the emotion type of "mildness". As shown in the figure, each type of emotion occupies a certain space in the emotion coordinate system 400. When performing calculation, a coordinate of the central point of the occupied space of each type of emotion can be used as a coordinate of this type of emotion. Thus, users A, B, and D (all having an emotion type of "happy") have the same coordinate in the emotion coordinate system 400, that is, the emotion coordinate of the central point of the emotion space of "happy". Similarly, input from user C has an emotion coordinate located at the central point of the emotion space of "mildness".

As for details of the above emotion coordinate system and the acquisition of the coordinate of each type of emotion, reference can be made to [http://en.wikipedia.org/wiki/PAD_emotional_state_model] [Mehrabian, Albert (1980). Basic dimensions for a general psychological theory. Pp. 39-53. ISBN 0-89946-004-6.] [Bales, Robert Freed (2001). Social interaction systems: theory and measurement. Pp. 139-140. ISBN 0-7658-0872-2.] [Liu, Ye; Fu, Xiaolan; Tao, Linmi: PAD Based Emotion Measurement; CCF Communication V6, Issue 5. Pp. 9-13, 2010.5], which is incorporated herein by reference in its entirety. FIG. 4B shows a schematic process of acquiring emotions in content of user input until an emotion matching degree is determined. In another embodiment, the step of classification of emotion types can be omitted, but emotional words/emoticons are directly mapped into the emotion coordinate system and these emotion coordinate systems are directly used to perform the following calculation.

After acquiring the target emotion coordinates 401A, 401B, 401C, 401D and the reference emotion coordinate 402, a distance between the target emotion coordinate and the reference emotion coordinate is calculated, which then serves as measure of the matching degree. In other words, in one embodiment, a distance between any arbitrary two points in the emotion coordinate system can be calculated using the following formula:

$$d(i,j) = \sqrt{(x_i-x_j)^2+(y_i-y_j)^2+(z_i-z_j)^2} \qquad (1)$$

In a three-dimensional coordinate system, the technique for calculating a distance between any arbitrary two points is known, and one of ordinary skill in the art also can use other methods to calculate the above distance.

Back to FIG. 2, after determining the matching degree between an emotion of user input content and an emotion expressed by the content to be pushed is determined, whether or not this matching degree satisfies a predetermined condition is judged, and when the emotion matching degree of the user satisfies the predetermined condition, specific content is pushed to the user. Specifically speaking, in one embodiment of the present invention, the predetermined condition can be whether the distance between a target emotion coordinate and a reference emotion coordinate is less than a predetermined threshold, for example, taking n distances of the shortest distance (i.e. taking a distance ranking at the $n^{th}$ in accordance with a shortest distance ranking as a threshold). It can be understood that, the shorter the distance between a target emotion coordinate and a reference emotion coordinate, the more similar the emotions represented by these two coordinates.

As shown in FIG. 4, in the emotion coordinate system 400, it shows that the target emotion coordinates 401A, 401B, 401D and the reference emotion coordinate 402 have the shortest distance there between (in this embodiment, the above coordinates overlap and all are the coordinate of the central point of the emotion space of "happy"), while the distance between the target emotion coordinate 401C and the reference emotion coordinate 402 is relatively far. When a proper threshold is selected, the input from user C (having the target emotion coordinate 401C) can be excluded, while specific content is pushed to users A, B, and D. On the other hand, the predetermined condition can be set to find the shortest distance between a target emotion coordinate and a reference emotion coordinate. What is selected is the user input that is most relevant to the content to be pushed. As shown in the figure, in the emotion coordinate system 400, it shows that the target emotion coordinates 401A, 401B, 401D and the reference emotion coordinate 402 have the shortest distance there between (overlap). At this point, the content inputted by users A, B, and D is regarded as most closely matching with the predetermined content to be pushed.

As described above, the emotion type of the predetermined content to be pushed ("share your joy with friends and you will have it doubled") can be predefined. In one embodiment of the present invention, the emotion coordinate of this predetermined content to be pushed also can be predefined. The emotion type and the emotion coordinate of content to be pushed can be determined ahead such that the content to be pushed can match with user input of a specific emotion type. In another embodiment, the predetermined content to be pushed can be subjected to emotional analysis, and then an emotion coordinate is acquired for this content to be pushed. The emotional analysis technology mentioned here is the same as the foregoing emotional analysis technology performed on user input.

After determining if user input satisfies the predetermined condition, a part of the text content is combined with the specific content to be pushed so as to form content to be pushed specific for users and to display the same on the predetermined webpage. As described above, the inputs from users A, B, and D are now selected as matching with the content to be pushed "share your joy with friends and you will have it doubled". Thus, a minimum syntagma of the text content to which the emotional words belong is determined using a semantic analysis tool. Herein, syntagma refers to a linguistic segment between two punctuations. For example, as for user A, the minimum syntagma containing the emotional word "gift" is "I received a mysterious gift today". As for users B and D, the minimum syntagmas containing emotional words are "really happy for you" and "how happy", respectively. In one embodiment of the present invention, these minimum syntagmas are combined with the predetermined content to be pushed in order to form content to be pushed specific for users. In one embodiment of the present invention, a combination template can be designed in advance for the content to be pushed, such that the content from user input is placed on a specific position relative to the content to be pushed, thereby forming new content to be pushed. FIG. 5 shows a push effect obtained after using the push technology of the present invention, wherein, the content after the push becomes:

I received a mysterious gift today, share your joy with friends and you will have it doubled;

really happy for you, share your joy with friends and you will have it doubled;

how happy! Share your joy with friends and you will have it doubled.

Since the matching degree between the emotion expressed by the inputs of users A, B, and D and the content to be pushed satisfies the predetermined condition, the user input and its emotion have been considered at the time of pushing and the pushed content formed by combining user inputs already contains the content inputted by the users themselves. Users can find that the pushed content contains the text content he/she input, which makes the user feel more connected to the pushed content. Such push technology will significantly improve user experience. In another embodiment, emoticons used by users also can be included in the content to be pushed.

As shown in the figure, the template herein simply adopts the form of "_____, content to be pushed" (the content extracted from the content of user input will fill the blank). However, one of ordinary skill in the art can appreciate that other forms of templates can be designed.

In one embodiment of the present invention, the content formed specific for users A, B, and D is subjected to semantic analysis, and the content which is most appropriately combined is selected. For example, in one embodiment of the present invention, content inputted by all the users of the website over a period of time is selected as a corpus, or another database containing massive user input content can be selected as a corpus. When a proper corpus is selected, the frequency at which the emotional words in the inputs of users A, B, and D and the predetermined keywords in the content to be pushed appear in the same sentence can be analyzed in this corpus, and pairs of emotional word and keyword having the highest frequency are selected. At least one of users A, B, and D can be selected as the most appropriate user input for combination, and then the selected syntagma is extracted from the user input to be combined with the predetermined content to be pushed. For example, if searching the corpus that shows the words "happy" and "joy" appear in the same sentence with the highest frequency, a part of the input of user D (that is, "how happy") can be selected to combine with the content to be pushed. One of ordinary skill in the art can understand that, several inputs that appear at a frequency higher than a predetermined threshold can be selected. In addition, appropriateness criteria can be adjusted. For example, when all user inputs that comply with the requirements of the matching degree fail to meet the appropriateness criteria, the threshold for the matching degree can be reduced, so more appropriate user inputs can be selected and the appropriateness determination is performed again.

An appropriateness analysis can determine that the content, is close to an emotion but the combined content is not appropriate for exclusion, for example, when the combined content is not compatible after the combination or is not suitable to use simultaneously in one sentence according to a linguistic habit.

Figure 6:
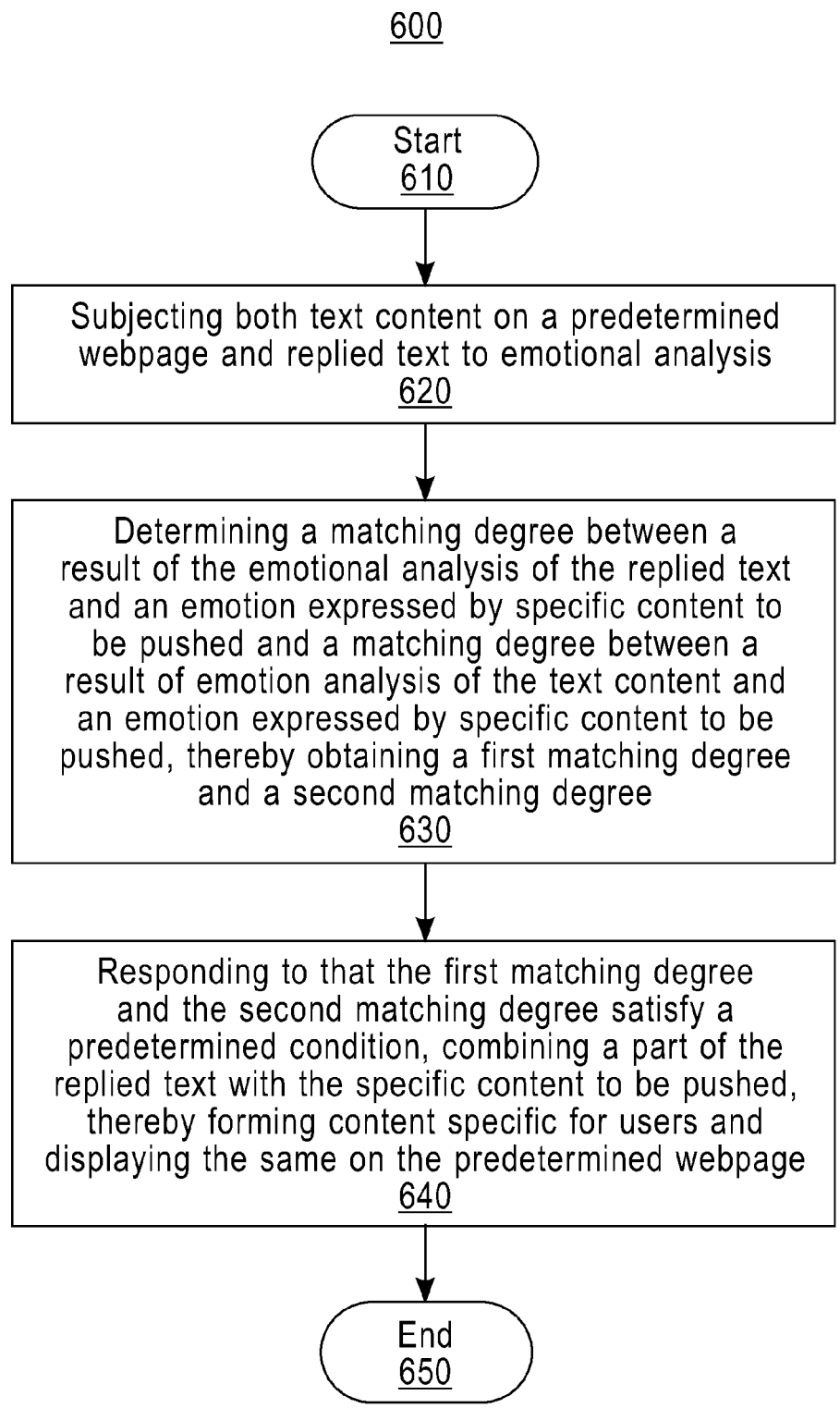
FIG. 6 shows a flowchart of a method 600 according to one embodiment of the present invention.

Below, the method 600 of the present invention will be described with reference to FIG. 6. FIG. 6 shows a flowchart of the method 600 according to one embodiment of the present invention. The method 600 starts at step 610. Subsequently, at step 620, text content on a predetermined webpage and reply text to this text content are both subjected to emotional analysis. At step 630, a matching degree between a result of the emotional analysis of the reply text and an emotion expressed by specific content to be pushed as well as a matching degree between a result of the emotional analysis of the text content and an emotion expressed by specific content to be pushed are determined. At step 640, responding to the matching degrees that satisfy a predetermined condition, a part of the reply text is combined with the specific content to be pushed, thereby forming content specific for users and displaying the same on predetermined webpage. Below, the respective steps of the method 600 will be described in detail in conjunction with the figures.

In the method 200 shown in FIG. 2, the text content input by users A, B, C, and D are subjected to emotional analysis and the resulting emotion coordinates are regarded as a target emotion coordinate, while the emotion coordinate of the content to be pushed is regarded as a reference emotion coordinate. Thus, an emotion distance of the user input content (including A, B, C, and D) relative to the predetermined content to be pushed (reference emotion coordinate) is determined. Different from the above embodiment, in the method 600 shown in FIG. 6, the emotion of the input content of user A is no longer regarded as a target, but is regarded as another reference. As a result, only the emotion coordinates of the input content of users B, C, and D that provide reply content are regarded as target emotion coordinates.

Specifically speaking, the emotional symbols and/or words extracted from the input content of user A are classified as a first emotion type from among a predetermined set of emotion types, while the emotional symbols and/or words extracted from the reply text to user A are classified as a second emotion type from among a predetermined set of emotion types. There may be a plurality of replies to user A, and thus there may be a plurality of second emotion types. Finally, the emotion type of the content to be pushed that is determined in advance can be regarded as a third emotion type. Next, the above-described first emotion type, second emotion type(s) and third emotion type are mapped onto the emotion coordinate system, thereby respectively obtaining a first emotion coordinate, a second emotion coordinate(s) and a third emotion coordinate. It is pretty clear that, herein, the first emotion coordinate corresponds to the input of user A, one or more second emotion coordinates correspond to one or more reply content to user A, while the third emotion coordinate corresponds to the content to be pushed. Details about determining emotion types and the mapping of emotion coordinates described above are the same as those set forth in the embodiment of FIG. 2, and thus descriptions thereof are omitted.

In this embodiment, the first emotion coordinate and the third emotion coordinate are used as reference points. A distance between each second emotion coordinate and the first emotion coordinate as well a distance between each second emotion coordinate and the third emotion coordinate are determined, and the sum of these distances are used as a measure of the matching degree.

Figures 7, 8:
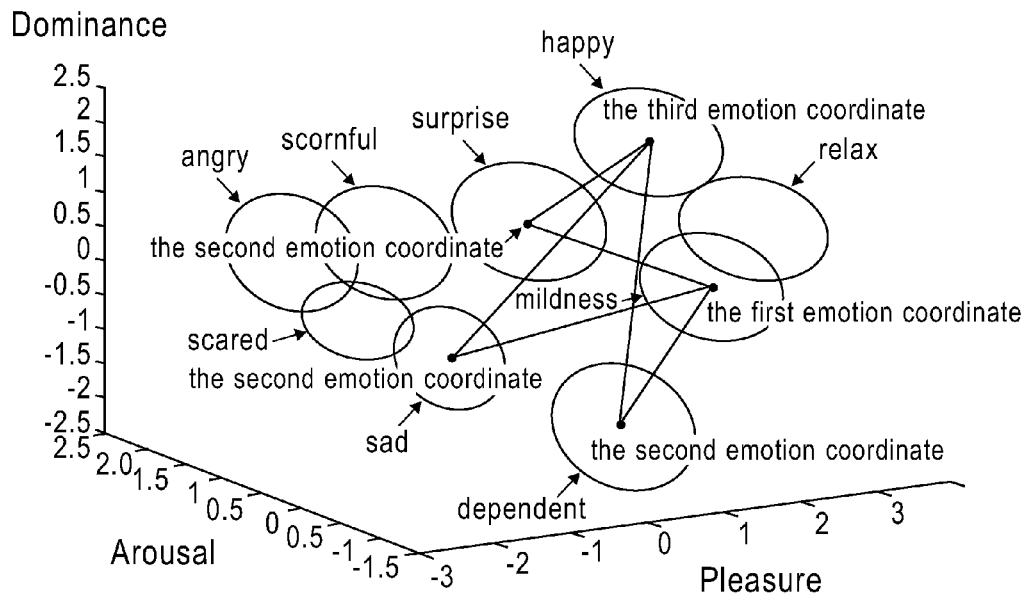
FIG. 7 shows a schematic view for determining emotion matching degree according to another embodiment of the present invention.
FIG. 8 shows an exemplary part of user inputs.

FIG. 7 shows a situation according to this embodiment. As shown in the figure, it is assumed that, the first emotion coordinate corresponding to user A represents "mildness" the third emotion coordinate corresponding to the content to be pushed represents "happy", and second emotion coordinates corresponding to the three users that provide reply content are "sad", "dependent", and "surprise". At this point, for the three replies, the distance between the first emotion coordinate and each of the second emotion coordinates is calculated as a measure of a first matching degree, the distance between each second emotion coordinate and the third emotion coordinate is calculated as a measure of a second matching degree, and a sum of these two measures is calculated, i.e. a distance sum of the two distances described above. In the example illustrated in the figure, it can be seen that the distance sum of the distance between user reply represented by "surprise" and the emotion of user A (the first emotion coordinate) and the distance between user reply represented by "surprise" and the emotion of the content to be pushed (the third emotion coordinate) is the smallest, and thus, the predetermined content can be pushed to the user reply of an emotion of "surprise".

In this embodiment, the user who posted a message (having an emotion of "mildness" and the content to be pushed (having an emotion of "happy") are used as two references, and the reply content that can appropriately transmit the emotion of the posted message into the emotion of the content to be pushed is selected from the plurality of reply content. That is, the emotion of "surprise" of the reply content is located between "mildness" and "happy" in the emotion coordinate system and has the shortest distance from "mildness" and "happy". The reply content selected in such a way functions as a "bridge" between user A who posted a message and the content to be pushed. As a result, the content to be pushed formed herein is user oriented, and only suitable content is pushed. This can significantly improve user experience. One of ordinary skill in the art can understand that, the matching degree can be determined by directly using the emotion coordinates of the extracted emotional words and emoticons, and the classification of emotion types is unnecessary.

One of ordinary skill in the art can understand that, in this embodiment, other steps are the same as those set forth in the embodiments of FIGS. 2 to 5, and descriptions thereof are omitted.

In the above embodiments, replies from users all involve a single emotion. FIGS. 8 and 9 show another situation. Sometimes, people may post messages with negative emotions on a webpage, such as, frustration with work and domestic problems. The above embodiments are still applicable, that is, the pushing is selectively carried out by determining a relationship between the emotion of the user and the emotion of the content to be pushed, or determining based on the user who posted the message and the content to be pushed whether to push the predetermined content to a part of the reply messages. However, in the above situation some replies may contain "emotional transitioned" content, which is good for transitioning the negative emotion of the user to a positive emotion. Thus, in one embodiment of the present invention, the focuses will be put on such transition of user emotion and appropriate content to be pushed, so as to help the user transitioning his/her emotion into a positive emotion.

Content to be pushed that is good for transitioning an emotion to a positive emotion can be selected. As an example, the following description, "As Heaven's movement is ever vigorous, so must a gentleman ceaselessly strive along," will be used as the content to be pushed. However, one of ordinary skill in the art can understand that other content that is good for transitioning an emotion to a positive emotion can be selected to be pushed, such as, transitioning from sad to happy and from frustrated to mildness.

FIG. 8 shows a part of user input. As shown in the figure, in one embodiment of the present invention, an analysis result can indicate that the input content "annoying" of user A is an "angry" emotion type. However, a semantic analysis can show that the reply content of user D (that is, "Be strong") contains an emotional transition, i.e. a transition from being boneless to strong. Thus, the emotional word "boneless" before emotional transition and the emotional word "strong" after emotional transition are extracted from the reply of user D by means of the semantic analysis. In one embodiment of the present invention, words containing emotional transitioned content also can be stored in a database in advance. By way of example, words such as "become", "be", "hope", "walk away from", "break away from", and "don't" all may represent emotional transitioned content.

FIG. 9 shows the calculation of the emotion coordinate system of this embodiment. As for the replies of users B and C (whose emotional words are "fighting" and "poor"), they do not contain emotional transitioned content, but the matching degree still can be calculated in the way described above. As for the input content of user D that contains emotional transitioned content, emotional words/emoticons before emotional transition and emotional words/emoticons after emotional transition are respectively classified into emotion types, thereby obtaining a fourth emotion type and a fifth emotion type, and also are mapped onto the emotion coordinate system, thereby obtaining a fourth emotion coordinate and a fifth emotion coordinate. Here, as for "Be strong", the emotion thereof before emotional transition is "weak", and thus the fourth emotion type is "scornful"; however, the emotion thereof after emotional transition is "strong", and thus the fifth emotion type is "mildness". Accordingly, the coordinates of the central points of the emotion spaces of "mildness" and "scornful" are determined as the fourth emotion coordinate and the fifth emotion coordinate.

As for user B, its emotional word is "fighting" and its emotion type can be classified as "dependent". As for user C, its emotional word is "poor" and its emotion type can be classified as "dependent". Thus, users B and C have the same emotion coordinate 902.

The example content to be pushed, "as Heaven's movement is ever vigorous, so must a gentleman ceaselessly strive along," can be predefined to have an emotion type of "happy" and have an emotion coordinate 903.

At this point, as shown in FIG. 9, a distance between the first emotion coordinate 901 (corresponding to "angry" of user A) and the fourth emotion coordinate 904 (corresponding to "scornful" of user D before emotional transition) is calculated as a measure of a first matching degree, a distance between the third emotion coordinate 903 (corresponding to the content to be pushed) and the fifth emotion coordinate 905 (corresponding to "mildness" of user D after emotional transition) is calculated as a measure of a second matching degree, and then a sum of the measure of the first matching degree and the measure of the second matching degree is calculated, i.e., a sum of the distance between emotion coordinates 901 and 904 and the distance between emotion coordinate 903 and 905. For the replies from users B and C, the distances between their emotion coordinates and the emotion coordinates 901 and 903, respectively, can be calculated, thus obtaining the distance sum for each use reply. The smallest distance sum or the distance sum which is smaller than a predetermined threshold is determined.

It can be known from FIG. 9 that, due to emotional transition, the emotion coordinate 904 before emotional transition will be relatively close to the emotion coordinate 901 (negative) of user A, while the emotion coordinate 905 after emotional transition generally will be relatively close to the emotion coordinate 903 (positive) of the content to be pushed. Thus, as shown in FIG. 9, a user reply containing emotional transition generally has a higher matching degree with the user input of a negative emotion and with the content that pushes a positive emotion, which shows that a sum of the distance between the first emotion coordinate and the fourth emotion coordinate and the distance between the third emotion coordinate and the fifth emotion coordinate is relatively small. At this moment, user reply whose distance sum is less than the predetermined threshold or user reply whose distance sum is the minimum is taken as a push target.

FIG. 10 shows an effect obtained after the push technology of this embodiment is applied. Similar to the foregoing embodiments, various templates can be designed for combining the content of user reply with the content to be pushed, thereby forming user-specific content to be pushed. In one embodiment of the present invention, similar to the foregoing description, an appropriateness determination can be carried out. For simplicity, descriptions thereof are omitted.

According to the embodiments of the present invention, user reply containing emotional transition can be identified, and thus content of a positive emotion can be appropriately and naturally pushed to a user of negative emotion. This greatly enhances the accuracy and appropriateness of the content to be pushed, and then significantly improves user experience.

Figure 11:
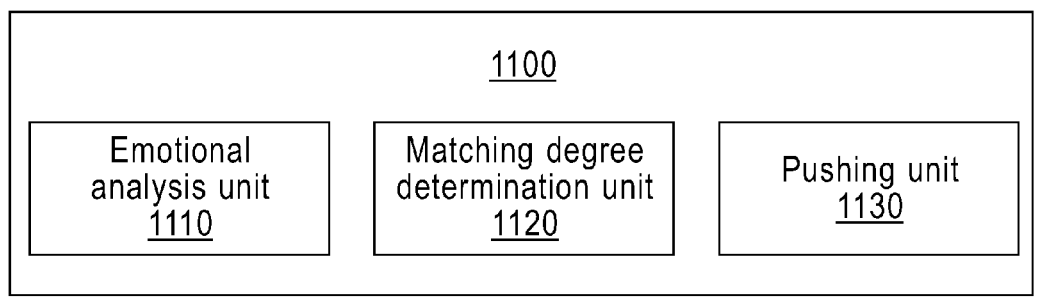
FIG. 11 shows an apparatus for pushing content for a webpage according to the embodiments of the present invention.

Below, an apparatus for pushing specific content to a predetermined webpage according to the present invention will be described. FIG. 11 shows an apparatus 1100 for pushing specific content for text content on a predetermined webpage according to one embodiment of the present invention, including: an emotional analysis unit 1110 configured to subject text content on a predetermined webpage to emotional analysis; a matching degree determination unit 1120 configured to determine a matching degree between a result of the emotional analysis and an emotion expressed by specific content to be pushed; and a pushing unit 1130 configured to combine a part of the text content with the specific content to be pushed, in response to the matching degree determined above that satisfies a predetermined condition, thereby forming content to be pushed specific for users.

Alternatively, the emotional analysis unit includes an extracting unit (not shown) configured to: extract emotional symbols representing emotions from the predetermined webpage, wherein, the symbols belong to a predefined symbol set; and extracting emotional words from the text content on the predetermined webpage.

Alternatively, the matching degree determination unit is further configured to: classify the extracted symbols and/or emotional words into emotion types in a predetermined set of emotion types as target emotion types, wherein the emotion types in the predetermined set of emotion types are predefined, and correspondence relations between symbols and/or emotional words and emotion types are known by searching a database in which correspondence relations between the emotional symbols and/or emotional words and emotion types are stored.

Alternatively, the matching degree determination unit is further configured to: regard emotion types to which specific content to be pushed belongs as reference emotion types; map the target emotion type and the reference emotion type into emotion coordinates in an emotion coordinate system, so as to obtain target emotion coordinates and reference emotion coordinates; calculate a distance between the target emotion coordinate and the reference emotion coordinate as a measure of a matching degree.

Alternatively, the matching degree satisfying a predetermined condition refers to one of the following: if a distance between the target emotion coordinate and the reference emotion coordinate is less than a predetermined threshold, it can be deemed that the matching degree satisfies the predetermined condition; if a target emotion coordinate is the one that provides the shortest distance from a reference emotion coordinate, it can be deemed that the matching degree between this target emotion coordinate and the reference emotion coordinate satisfies the predetermined condition.

Alternatively, when several emotional words concurrently appear in the text content, a matching degree is determined respectively for each one of these emotional words.

Alternatively, a part of the text content is a minimum syntagma containing this specific symbol and/or emotional word, wherein syntagma refers to a linguistic segment between two punctuations.

Alternatively, the pushing unit combines a part of the text content with the push specific content by means of a predetermined template.

Alternatively, the pushing unit comprises an appropriateness determination unit configured for determining an appropriateness of the combination of a part of the text content with the specific content to be pushed, and displaying this combination on the predetermined webpage only when the combination is appropriate.

An apparatus 1100 for pushing specific content for text content on a predetermined webpage according to another embodiment of the present invention includes: an emotional analysis unit 1110 configured to subject both text content on a predetermined webpage and reply text to emotional analysis; a matching degree determination unit 1120 configured to determine a matching degree between a result of emotional analysis of the reply text and an emotion expressed by specific content and a matching degree between a result of emotional analysis of the text content and an emotion expressed by specific content to be pushed, thereby obtaining a first matching degree and a second matching degree; and a pushing unit 1130 configured to combine a part of the reply text with the specific content to be pushed, in response to that the first matching degree and the second matching degree determined above that satisfy a predetermined condition, thereby forming content to be pushed specific for users.

Alternatively, the emotional analysis unit comprises an extracting unit (not shown) configured to: extract emotional symbols representing emotions from the text content on the predetermined webpage and the reply text, wherein, the emotional symbols belong to a predefined symbol set; and extract emotional words from the text content on the predetermined webpage and the reply text.

Alternatively, the matching degree determination unit is further configured to: classify the emotional symbols and/or words extracted from the text content on the predetermined webpage into emotion types in a predetermined set of emotion types as a first emotion type, and classifying the emotional symbols and/or words extracted from the reply text into emotion types in the predetermined set of emotion types as a second emotion type, wherein correspondence relations between the emotional symbols and/or words and emotion types are known by searching a database in which correspondence relations between the emotional symbols and/or words and emotion types are stored.

Alternatively, the matching degree determination unit is further configured to: regard emotion types to which specific content to be pushed belongs as a third emotion type; if the reply text does not contain emotional transition, map the first emotion type, the second emotion type and the third emotion type into an emotion coordinate system respectively, so as to obtain a first emotion coordinate, a second emotion coordinate and a third emotion coordinate; calculate a distance between the first emotion coordinate and the second emotion coordinate as a measure of a first matching degree and calculating a distance between the second emotion coordinate and the third emotion coordinate as measure of a second matching degree.

Alternatively, the matching degree determination unit is further configured to: regard emotion types to which specific content to be pushed belongs as a third emotion type; if the replied text contains emotional transition, extract the emotional symbols and/or words before the emotional transition and the emotional symbols and/or words after the emotional transition and classify them into emotion types in the predetermined set of emotion types, thereby respectively obtaining a fourth emotion type and a fifth emotion type; map the first emotion type, the third emotion type, the fourth emotion type and the fifth emotion type into an emotion coordinate system, so as to obtain a first emotion coordinate system, a third emotion coordinate, a fourth emotion coordinate and a fifth emotion coordinate; calculate a distance between the first emotion coordinate and the fourth emotion coordinate as measure of a first matching degree and calculate a distance between the third emotion coordinate and the fifth emotion coordinate as measure of a second matching degree.

Alternatively, the matching degree satisfying a predetermined condition refers to one of the following: if a sum of the measure of the first matching degree and the measure of the second matching degree is less than a predetermined threshold, it can be deemed that the first matching degree and the second matching degree satisfy the predetermined condition; or a sum of the measure of the first matching degree and the measure of the second matching degree is obtained for all the reply texts, and the matching degree of the reply text is the minimal one that satisfies the predetermined condition.

Alternatively, when several emotional words concurrently appear in one of the text content on the predetermined webpage and the reply text, a matching degree is determined respectively for each one of these emotional words.

Alternatively, if the text content on the predetermined webpage contains both symbols and emotional words, a matching degree is determined respectively for the extracted symbols and emotional words.

Alternatively, a part of the replied text is a minimum syntagma containing this specific symbol and/or emotional word, wherein syntagma refers to a linguistic segment between two punctuations.

Alternatively, the pushing unit combines a part of the reply text with the push specific content by means of a predetermined template.

Alternatively, the pushing unit includes an appropriateness determination unit configured to determine an appropriateness of the combination of a part of the reply text with the specific content to be pushed, and displaying this combination on the webpage on which the text content locates only when the combination is appropriate.

One of ordinary skill in the art can understand that, the apparatus 1100 can reside in a specific website for pushing content for a webpage of this website. On the other hand, the apparatus 1100 also can reside in a server, for remotely pushing content for a webpage of other websites through a network interface of the server. Many embodiments of the present invention have been described above, however, it should be understood that, these embodiments are illustrative not exclusive. For example, both emotional words and emoticons can concurrently appear in a user reply, and the emotional words and the emoticons can be respectively subjected to matching degree analysis so as to find a matching degree that satisfies a predetermined condition. In this embodiment, when performing combinations, emoticons can be combined, and minimum syntagmas containing emotional words in sentences where the emoticons is located also can be combined. In another embodiment, there may be several emotional words in the text of user input (text of the initial input and text of the subsequent reply). At this time, no matter how many reference or target emotion coordinates there are, according to the spirit of the present invention, only a user reply(s) whose matching degrees with these reference or target matching degree satisfy the predetermined condition is selected. Thus, an emotion matching degree can be respectively calculated for these emotional words, and finally user input text that satisfies the predetermined condition is searched for combination.

It is worth mentioning that, software and hardware of a computer are mutually transferable; for example, a piece of software code can be transferred to corresponding hardware (such as, field programmable gate array (FPGA) or transferred to corresponding dedicated chip by means of hardware description language (e.g. Verlog). Thus, the embodiments of the present invention can be implemented using software, hardware, or firmware. The embodiments of the present invention have sufficiently disclosed components of the apparatus for implementing the present invention and also disclosed connection relations among these components by signal transmission. Thus, one of ordinary skill in the art absolutely can understand that, the technology disclosed herein can be implemented in a hardware or firmware manner. In addition, for simplicity, this specification only describes those steps and modules that are closely related to the implementation of the present invention, while other components are omitted. However, one of ordinary skill in the art should understand that, the method and apparatus of the present invention can include steps and modules other than those described above.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for pushing specific content for text content on a predetermined webpage, comprising:

receiving, at a processing device of a computer, text content of a predetermined web page, said text content including a first text content input from a first user and reply text content input from other users in reply to the first user text content;

classifying, using the processor device, both the first text content of the first user and each of the reply text content of the other users received via the predetermined webpage according to an emotional type from among a predetermined set of emotional types; and determining, by the processor device, for each said reply text content from said other users, a first matching degree between a classification result of the reply text content of a user and a classification result of the first text content, and determining a second matching degree between the classification result of the reply text content of the user and an emotion type expressed by the specific content to be pushed; and determining, by the processor device, whether the first matching degree and the second matching degree satisfy a predetermined condition;

in response to that the first matching degree and the second matching degree determined satisfying a predetermined condition, combining, by the processor device, a part of the reply text content of the user with the specific content to be pushed to form pushing content specific for one or more said other users; and generating, using said processor device, an output for communication over a communications network to provide said pushing content to the web page displayed on a device associated with said one or more other users.

2. The computer-implemented method of claim 1, wherein the classifying the first text content and the reply text content of the user comprises at least one of:

extracting, by the processor device, emotional symbols from the text content of the first user and the each said reply text content of the other users, wherein the emotional symbols belong to a predefined symbol set; and extracting, by the processor device, emotional words from the text content of the first user and from each reply text content of the other users.

3. The computer-implemented method of claim 2, wherein the classifying comprises:

classifying, by the processor device, the emotional symbols and/or emotional words extracted from the first text content into corresponding emotion types from the predetermined set of emotion types as a first emotion type, and classifying the emotional symbols and/or emotional words extracted from each of the reply text content of the other users into corresponding second emotion types from the predetermined set of emotion types, wherein correspondence relations between the emotional symbols and/or emotional words and the emotion types are obtained by searching a database in which correspondence relations between the emotional symbols and/or emotional words and the emotion types are stored.

4. The computer-implemented method of claim 3, further comprising:

obtaining, by the processor device, a third emotion type corresponding to the specific content to be pushed;

and for each said reply text content from other users:
  determining, by the processor device, whether a reply text content of a user includes a word indicating an emotional transition; and
  if the reply text content of the user does not contain emotional transition,
    mapping, by the processor device, the first emotion type, the corresponding second emotion type and the third emotion type into an emotion coordinate system, so as to obtain a first emotion coordinate, a corresponding second emotion coordinate and a third emotion coordinate; and
  calculating, by the hardware processor device, a respective distance between the first emotion coordinate and the corresponding second emotion coordinate as a first matching degree measure, and calculating a distance between the corresponding second emotion coordinate and the third emotion coordinate as a second matching degree measure.

5. The computer-implemented method of claim 3, wherein obtaining the first matching degree and the second matching degree comprises:
  obtaining, by the processor device, a third emotion type corresponding to the specific content to be pushed;
  and for each said reply text content from other users:
    determining, by the processor device, whether the reply text content of a user includes a word indicating an emotional transition; and
    if the replied text content of the user contains emotional transition,
      extracting, by the processor device, emotional symbols and/or emotional words before the emotional transition and emotional symbols and/or emotional words after the emotional transition word of the reply text content, and respectively classifying them into a corresponding fourth emotion and a corresponding fifth emotion types from the predetermined set of emotion types;
      mapping, by the processor device, the first emotion type, the third emotion type, the fourth emotion type and the fifth emotion type into an emotion coordinate system, so as to obtain a first emotion coordinate, a third emotion coordinate, a fourth emotion coordinate and a fifth emotion coordinate; and
    calculating, by the processor device, a distance between the first emotion coordinate and the fourth emotion coordinate as a measure of the first matching degree and calculating a distance between the third emotion coordinate and the fifth emotion coordinate as a measure of the second matching degree.

6. The computer-implemented method of claim 5, wherein the determining whether the first matching degree and the second matching degree satisfy a predetermined condition comprises one of:
  determining, by the processor device, if a sum of the measure of the first matching degree and the measure of the second matching degree is less than a predetermined threshold; and
  for each reply text content of the other users, determining by said processor device a corresponding sum of the measure of the first matching degree and the measure of the corresponding second matching degree, wherein the second matching degree of the reply text content that provides the minimum sum satisfies the predetermined condition.

7. The computer-implemented method of claim 1, wherein a part of the reply text content is combined with the specific content to be pushed by means of a predetermined template.

8. The computer-implemented method of claim 1 further comprises:
  determining, by the hardware processor device, an appropriateness of the combination of the part of the replied text with the specific content to be pushed, and displaying this combination on the webpage on which the text content locates only when the combination is appropriate.

9. An apparatus for pushing specific content for text content on a predetermined webpage comprising:
  a memory storage device;
  a processing device of a computer in operative communication with said memory, the processing device configured to:
    receive text content of a predetermined web page, said text content including a first text content input from a first user and reply text content input from other users in reply to the first user text content;
    classify both the first text content of the first user and each of the reply text content of the other users received via the predetermined webpage according to an emotional type from among a predetermined set of emotional types;
    determine, for each said reply text content from the other users, a first matching degree between a classification result of the reply text content of a user and a classification result of the first text content, and determining a second matching degree between the classification result of the reply text content of the user and an emotion type expressed by the specific content to be pushed; and
    determine whether the first matching degree and the each respective second matching degree satisfy a predetermined condition;
    in response to that the first matching degree and the second matching degree determined satisfying a predetermined condition, combine a part of the reply text content with the specific content to be pushed to form pushing content specific for one or more said other users; and
  generate an output for communication over a communications network to provide said pushing content to the web page displayed on a device associated with said one or more other users.

10. The apparatus of claim 9, wherein to classify the first text content and the each reply text content, said processor is further configured to:
  extract emotional symbols from the text content of the first user and each of the reply text content of the other users, wherein the emotional symbols belong to a predefined symbol set; and
  extract emotional words from the text content of the first user and from each reply text content of the other users.

11. The apparatus of claim 10, wherein to classify the first text content and the each reply text content, said processor is further configured to:
  classify the emotional symbols and/or emotional words extracted from the first text content into corresponding emotion types from the predetermined set of emotion types as a first emotion type, and classifying the emotional symbols and/or emotional words extracted from each of the reply text content of the other users into corresponding second emotion types from the predetermined set of emotion types, wherein correspondence relations between the emotional symbols and/or emotional words and the emotion types are obtained by searching a database in which correspondence relations between the emotional symbols and/or emotional words and the emotion types are stored.

12. The apparatus of claim 11, wherein said processor device is further configured to:
obtain a third emotion type corresponding to the specific content to be pushed;
and for each said reply text content from said other users:
determine whether the reply text content of other users a user includes a word indicating an emotional transition; and
if the reply text content of the user does not contain emotional transition,
map the first emotion type, the corresponding second emotion type and the third emotion type into an emotion coordinate system, so as to obtain a first emotion coordinate, a corresponding second emotion coordinate and a third emotion coordinate; and
calculate a respective distance between the first emotion coordinate and the corresponding second emotion coordinate as a first matching degree measure, and calculate a distance between the corresponding second emotion coordinate and the third emotion coordinate as a measure of the second matching degree.

13. The apparatus of claim 11, wherein to determine the first matching degree and the second matching degree, said processor device is further configured to:
obtain a third emotion type corresponding to the specific content to be pushed;
and for each said reply text content from said other users:
determine whether the reply text content of a user includes a word indicating an emotional transition; and
if the replied text content of the user contains emotional transition,
extract emotional symbols and/or emotional words before the emotional transition and emotional symbols and/or emotional words after the emotional transition word of the reply text content, and respectively classify them into a corresponding fourth emotion and a corresponding fifth emotion types from the predetermined set of emotion types;
map the first emotion type, the third emotion type, the fourth emotion type and the fifth emotion type into an emotion coordinate system, so as to obtain a first emotion coordinate, a third emotion coordinate, a fourth emotion coordinate and a fifth emotion coordinate; and
calculate a distance between the first emotion coordinate and the fourth emotion coordinate as a measure of the first matching degree and calculate a distance between the third emotion coordinate and the fifth emotion coordinate as a measure of the second matching degree.

14. The apparatus of claim 13, wherein to determine whether the first matching degree and the second matching degree satisfy a predetermined condition, the processor device is further configured to one of:
determine if a sum of the measure of the first matching degree and the measure of the second matching degree is less than a predetermined threshold; and
for each reply text content of the other users, determine a corresponding sum of the measure of the first matching degree and the measure of the corresponding second matching degree, wherein the second matching degree of the reply text content that provides the minimum sum satisfies the predetermined condition.

15. A computer program product comprising a non-transitory computer readable medium tangibly embodying computer readable instructions which, when executed, cause a computer to perform a method for pushing specific content for text content on a predetermined webpage, said method comprising:
receiving text content of a predetermined web page provided for display at one or more user devices connected to the computer over a network, said text content including a first text content associated with a first user and reply text content associated with other users in reply to the first user text content;
classifying both the first text content of the first user and each of the reply text contents of the other users received via the predetermined webpage according to an emotional type from among a predetermined set of emotional types;
determining, for each said reply text content from said other users, a first matching degree between a classification result of the reply text content of a user and a classification result of the first text content, and determining a second matching degree between the classification result of the reply text content of the user and an emotion type expressed by the specific content to be pushed; and
determining whether the first matching degree and the second matching degree satisfy a predetermined condition;
in response to that the first matching degree and the second matching degree determined satisfying a predetermined condition, combining, by the processor device, a part of the reply text content of the user with the specific content to be pushed to form pushing content specific for one or more said other users; and
generating an output for communication over a communications network to provide said pushing content to the web page displayed on a device associated with said one or more other users.

16. The computer program product of claim 15, wherein the classifying the first text content and the reply text content comprises at least one of:
extracting, by the processor device, emotional symbols from the text content of the first user and each the reply text content of the other users, wherein the emotional symbols belong to a predefined symbol set; and
extracting, by the processor device, emotional words from the text content of the first user and from each reply text content of the other users; and
classifying the emotional symbols and/or emotional words extracted from the first text content into corresponding emotion types from the predetermined set of emotion types as a first emotion type, and classifying the emotional symbols and/or emotional words extracted from each of the reply text content of the other users into corresponding second emotion types from the predetermined set of emotion types,
wherein correspondence relations between the emotional symbols and/or emotional words and the emotion types are obtained by searching a database in which correspondence relations between the emotional symbols and/or emotional words and the emotion types are stored.

17. The computer program product of claim 16, further comprising:

obtaining a third emotion type corresponding to the specific content to be pushed;

and for each said reply text contents from other users:

determining whether a reply text content of a user includes a word indicating an emotional transition; and if the reply text content of the user does not contain emotional transition, mapping the first emotion type, the corresponding second emotion type and the third emotion type into an emotion coordinate system, so as to obtain a first emotion coordinate, a second emotion coordinate and a third emotion coordinate; and calculating a respective distance between the first emotion coordinate and the corresponding second emotion coordinate as a first matching degree measure, and calculating a distance between the corresponding second emotion coordinate and the third emotion coordinate as a second matching degree measure.

18. The computer program product of claim 16, wherein obtaining the first matching degree and the second matching degree comprises:

obtaining a third emotion type corresponding to the specific content to be pushed;

and for each said reply text contents from other users:

determining whether the reply text content of a user includes a word indicating an emotional transition; and if the replied text content of the user contains emotional transition, extracting emotional symbols and/or emotional words before the emotional transition and emotional symbols and/or emotional words after the emotional transition word of the reply text content, and respectively classifying them into a corresponding fourth emotion and a corresponding fifth emotion types from the predetermined set of emotion types;

mapping the first emotion type, the third emotion type, the fourth emotion type and the fifth emotion type into an emotion coordinate system, so as to obtain a first emotion coordinate, a third emotion coordinate, a fourth emotion coordinate and a fifth emotion coordinate; and calculating a distance between the first emotion coordinate and the fourth emotion coordinate as a measure of the first matching degree and calculating a distance between the third emotion coordinate and the fifth emotion coordinate as a measure of the second matching degree.

* * * * *